United States Patent [19]

Häfner

[11] Patent Number: 4,700,566
[45] Date of Patent: Oct. 20, 1987

[54] DEVICE FOR DIVIDING VECTOR FORCES INTO THEIR COMPONENTS

[75] Inventor: Hans W. Häfner, Aichach, Fed. Rep. of Germany

[73] Assignee: Pfister GmbH, Augsburg, Fed. Rep. of Germany

[21] Appl. No.: 888,178

[22] Filed: Jul. 22, 1986

[30] Foreign Application Priority Data

Aug. 9, 1985 [DE] Fed. Rep. of Germany ....... 3528727

[51] Int. Cl.⁴ .......................... G01L 5/16; G01M 9/00
[52] U.S. Cl. ................................. 73/147; 73/862.04; 177/DIG. 9
[58] Field of Search ................ 73/147, 862.28, 862.58, 73/862.62, 862.04; 177/DIG. 9, 208, 209

[56] References Cited

U.S. PATENT DOCUMENTS

| | | | |
|---|---|---|---|
| 4,112,752 | 9/1978 | Hafner et al. | 73/147 |
| 4,466,297 | 8/1984 | Hafner | 73/862.04 |
| 4,480,707 | 11/1984 | Hafner | 177/208 |
| 4,644,802 | 2/1987 | Hafner | 73/862.38 |

Primary Examiner—Donald O. Woodiel
Attorney, Agent, or Firm—Armstrong, Nikaido, Marmelstein & Kubovcik

[57] ABSTRACT

A device for dividing vector forces into their X- and/or Y- and Z-components comprising a main body having a flat upper surface inclined to the horizontal; a wedge having a bottom surface inclined to the horizontal engaging essentially friction-free the upper surface of the main body, and a flat horizontal upper surface; at least one first force measuring element acting in a direction of the wedge action and being provided in a fixed relationship to the main body; an upper element having a flat bottom side bearing essentially friction-free in horizontal directions on the horizontal upper surface of the wedge and receiving a vector force to be measured; and at least one second force measuring element each acting in the at least one of the X- and Y-direction, limiting any movement of the upper element and being arranged in fixed relationship to the main body.

14 Claims, 8 Drawing Figures

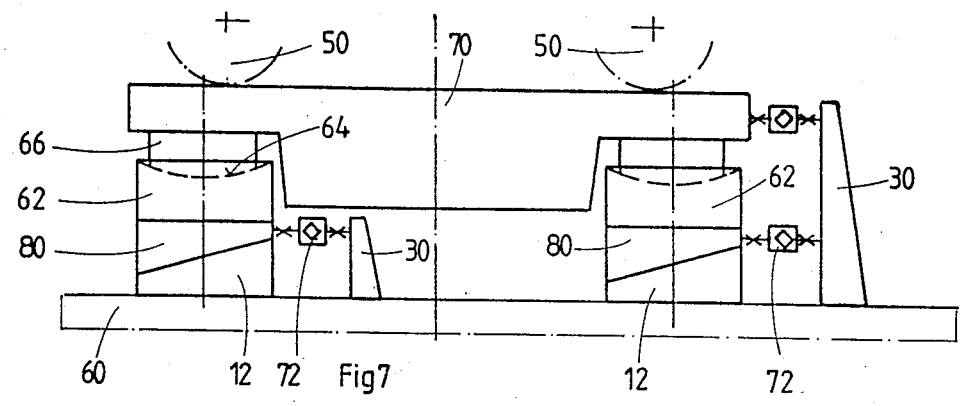
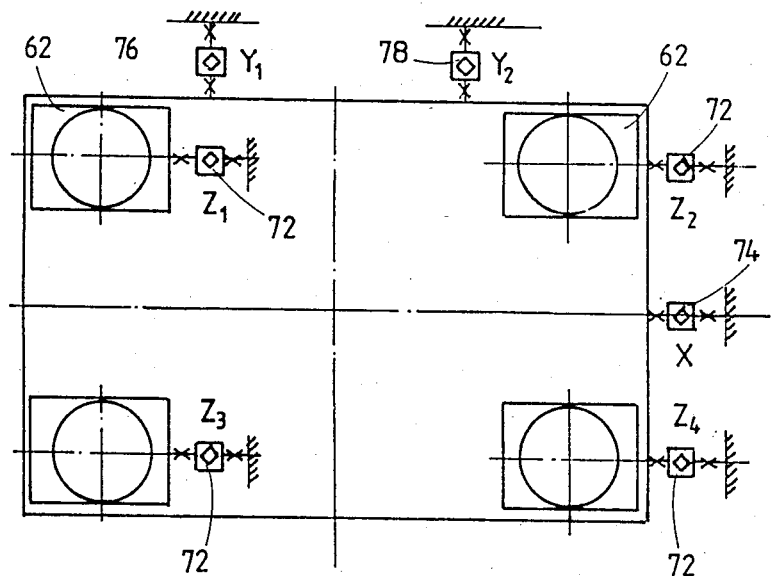
Fig 8

DEVICE FOR DIVIDING VECTOR FORCES INTO THEIR COMPONENTS

FIELD OF THE INVENTION

The invention relates to a device for dividing vector forces into their X- and/or Y- and Z-components and to an apparatus using such devices for measuring forces applied to an object particularly in a wind tunnel.

BACKGROUND OF THE INVENTION

With devices for dividing vector forces into their components it is very difficult to achieve a division without an interaction at high accuracy since all measures taken for an interaction-free division are accompanied by other affects as friction which affect the accuracy of measurement. Mechanical devices are complicated and voluminous in design. Piezoelectric devices are relatively inaccurate, temperature-sensitive and not applicable for static measurements even in a range of a few seconds.

The U.S. Pat. No. 4,112,752 discloses a force measuring apparatus for measuring the forces of a flowing medium, such as air flow in a wind tunnel, acting on an object where aerodynamic properties are to be investigated. The object is secured to an object carrier which is mounted in a bearing system permitting movement in the directions of the force components in vertical and mutually perpendicular horizontal directions, the object carrier being connected to a force measuring device in each of these directions. The object carrier is supported by hydrostatic bearings so as to be moveable in the directions of the force components to be measured. As force measuring devices strain gauge devices are used. There are three support and guiding means of complex design where one support and guiding means is inserted into the other. Thus, the design is rather complex and expensive.

SUMMARY OF THE INVENTION

It is the object of the present invention to provide a device for dividing vector forces into their components, which device has a very simple design.

It is another object of the present invention to provide a device for dividing vector forces into their components, which device is essentially free of interaction in respect of the components.

It is a further object of the present invention to provide a device for dividing vector forces into their components, which device has an excellent accuracy of measurement.

These and other objects are achieved by a device for dividing vector forces into their X- and/or Y- and Z-components comprising a main body having a flat upper surface inclined to the horizontal; a wedge having a bottom surface inclined to the horizontal engaging essentially frictionfree the upper surface of the main body, and a flat horizontal upper surface; at least one first force measuring element acting in a direction of the wedge action and being provided in a fixed relationship to the main body; an upper element having a flat bottom side bearing essentially frictionfree in horizontal directions on the horizontal upper surface of the wedge and receiving a vector force to be measured; and at least one second force measuring element each acting in the at least one of the X- and Y-direction, limiting any movement of the upper element and being arranged in fixed relationship to the main body.

Since the upper wedge surface extends in horizontal direction the element placed on top of this surface is two-dimensionally movable narrowly limited by the force elements acting in the X- and/or Y-direction, respectively.

The device according to the invention has many applications. A preferred example is a force measuring apparatus used in connection with a wind tunnel which apparatus may have the form of a 6-components or 7-components design, as known in the art.

Further features and advantages of the device according to the invention will be more apparent from the following description in connection with the drawings.

BRIEF DESCRIPTION OF THE DRAWINGS

FIG. 7 is an elevational view of an apparatus similar to that of FIG. 5, but having a 6-components design using modified devices according to the invention; and FIG. 8 is a plan view onto the apparatus of FIG. 7.

FIGS. 1 and 2 schematically illustrate the principal design of a first embodiment of a device for dividing vector forces into their X-, Y- and Z-components according to the invention. The device supports on a base 10 and comprises on top of each other a main body 12 placed on the base 10 and having a flat upper surface 14 inclined to the horizontal, a wedge 16 having a bottom side inclined to the horizontal and bearing essentially frictionfree against the surface 14 of the main body 12 by means of well-known hydrostatic bearings (not shown). The wedge 16 is provided with a flat horizontal upper surface 18 supporting essentially frictionfree by means of hydrostatic bearings (not shown) an upper element 20 exemplary having the form of a plane-parallel plate. The upper element 20 serves as a force introduction element or it is connected to a force introduction element.

Figure 1:
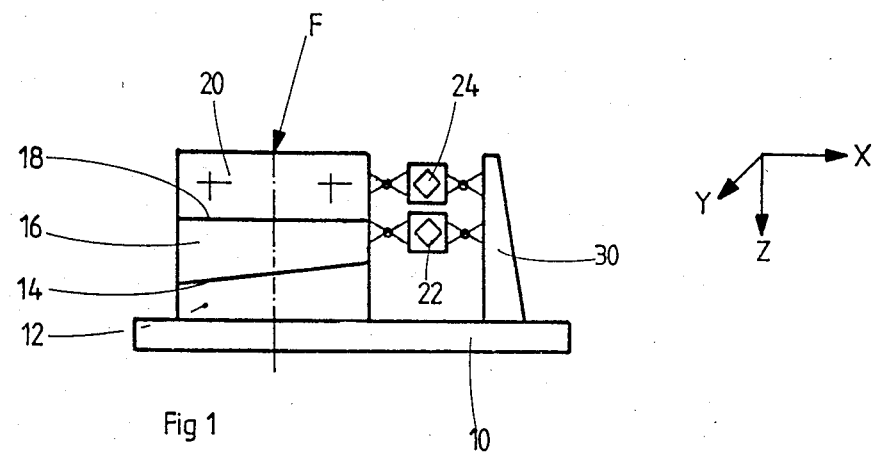
FIG. 1 is a schematic elevational view of a first embodiment of the device according to the invention.

This stack of elements of the force dividing device is maintained in position particularly by force measuring elements 22, 24, 26 and 28 which are secured to support means 30, 31 extending upwards from the base 10.

Preferably, the force measuring elements operate in the two opposite directions. Alternatively, each force measuring element may be opposed by a further force measuring element at the opposite parallel side of the element 20 or each force measuring element may biassed in one direction in case force measuring elements are used operating only in one direction. The force measuring elements may be of any appropriate well-known type as strain gauge elements, elastostatic force measuring elements, piezoresistive elements etc.

The force measuring element 22 connected to the wedge 16 measures the Z-component of the force exerted onto the upper element 20 with a certain ratio due to the wedge affect. The force measuring elements 24, 26 and 28 are connected to the upper element 20, the force measuring element 24 measuring the force component in X-direction whilst the force measuring elements 26 and 28 determine the force component in Y-direction. Using two force measuring elements 26 and 28 ensures an exactly defined position in the two horizontal directions such that no tilting may occur. In principle, one force measuring element may be sufficient.

It should be noted that the top side of the upper element 20 may be formed depending on the type of use of the device. The elements 12, 16 and 20 preferably are made of metal though in some cases synthetic material may be used. The principle of the hydrostatic bearing of a wedge is well-known and exemplary described in the British Patent Specification No. 977 277.

Figure 2:
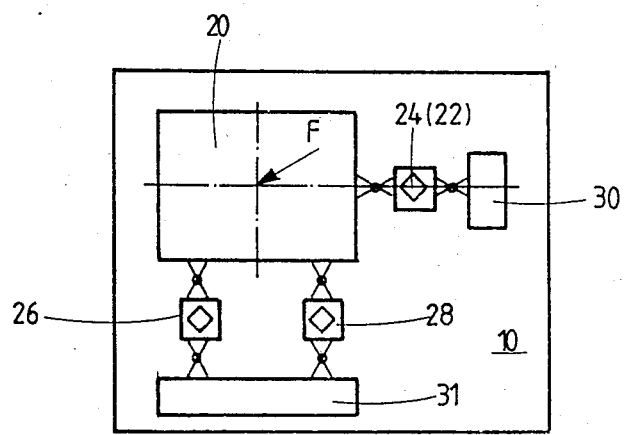
FIG. 2 is a plan view onto the device of FIG. 1.
Figure 3:
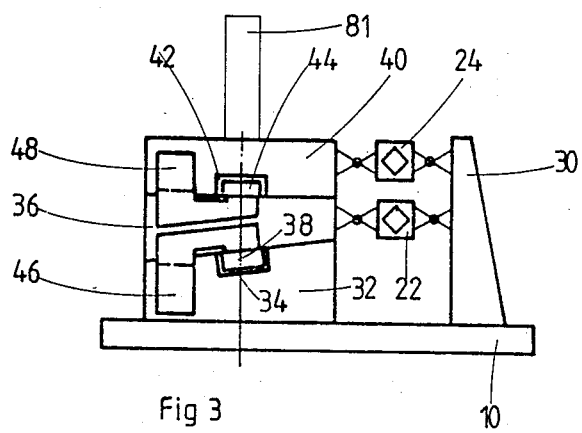
FIG. 3 is a schematic elevational view of a second embodiment of the device according to the invention.
Figure 4:
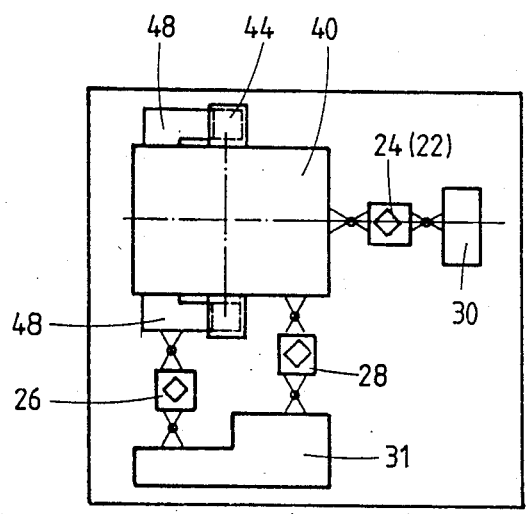
FIG. 4 is a plan view of the device of FIG. 3.

FIGS. 3 and 4 show a second embodiment of the device according to the invention designed according to the same principles as the embodiment of FIGS. 1 and 2 with the exception that means are provided avoiding a tilting of the upper element which may happen when the object is placed in a flowing medium on top of a stem fixed to the top side of the upper element.

As a modification of the embodiment of FIGS. 1 and 2 a main body 32 is provided at its upper side with a groove 34 extending transversely to a wedge 36 through the main body 32. Exemplary the groove 34 is of rectangular cross section for receiving a transverse bar 38 provided at the bottom side of the wedge 36 and projecting there-from at each side (see FIG. 4). A similar transverse bar 44 is provided at the upper side of the wedge 36 in a groove 42 provided at the bottom side of an upper element 40.

Hooks 46 and 48, respectively, laterally provided at the main body 32 and the upper element 40, respectively, engage the two bars 38 and 44. The hooks 46 and 48 engage the upper and lower side, respectively, of the transverse bars 38 and 44, respectively, via hydrostatic bearings such that a lateral movement of the wedge 36 and the upper element 40 is essentially frictionfree whilst a tilting of the two elements is prevented.

It should be noted that tilting may be prevented by means other than that explained above.

Figure 5:
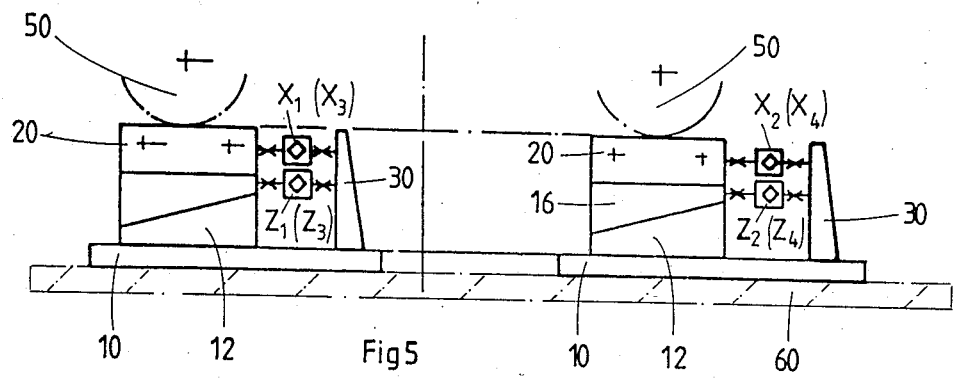
FIG. 5 is a schematic elevational view of a force measuring apparatus used in connection with a wind tunnel in 7-components design using devices according to the invention.
Figure 6:
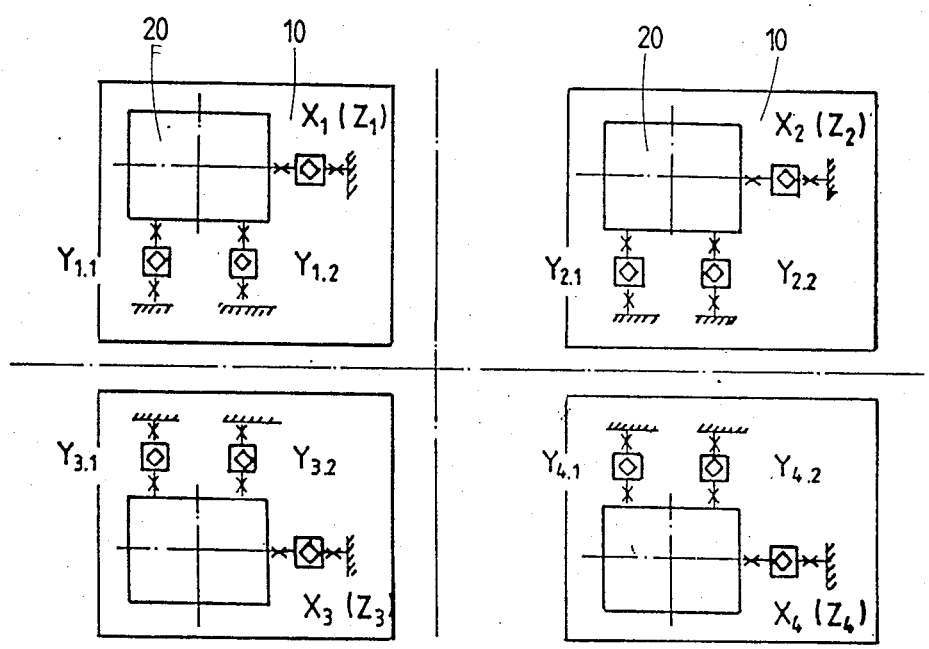
FIG. 6 is a plan view onto the apparatus of FIG. 5.

FIGS. 5 and 6 illustrate the application of force division devices according to the invention for a 7-component wind tunnel force measuring apparatus for vehicle investigations. On a horizontal turn-table four force division devices, exemplary according to FIGS. 1 and 2, are placed preferably in a two-dimensionally shiftable manner (see FIG. 6). The upper elements 20 serve as force introduction bodies supporting wheels 50 of a vehicle, particularly a car, to be tested (see FIG. 5). Since the force division devices are shiftable in two dimensions on the turn table they may be adjusted in a very simple manner to the distances of the wheels in longitudinal and transversal directions.

The force components in the X-, Y- and Z-directions determined by the force measuring elements of the individual force division devices are evaluated in a well-known manner. Since the force division devices are shiftable on the turn table the design of the wind tunnel force measuring apparatus is very simple. Compared thereto known wind tunnel measuring apparatuses are very complex due to the fixedly mounting of the force division units on the turn-table which necessitates adjustable force introduction elements.

FIGS. 7 and 8 show a 6-components wind tunnel force measuring apparatus using force division devices according to the invention. Again, on a rigid turn-table 60 four force division devices are fixedly secured to the turn-table 60. Upper elements 62 of the force division devices have top sides provided with a preferably spheric recess 64. A platform 70, supporting wheels 50 of a car to be tested, is provided at its bottom side with projections 66 having spherically formed lower ends fitting into the recesses 64. The platform 70 is placed onto the four force division devices bearing thereon essentially frictionfree by means of hydrostatic bearings between the projections 66 and the recesses 64 of the upper elements 62. Horizontal force measuring elements 74 for the X-direction and 76 and 78 for the Y-direction are provided only once for the four force division devices and are connected at sides of the platform 70. Only in the Z-direction for each force division device a force measuring element 72 is provided connected to associated wedges 80.

Again the six components wind tunnel force measuring apparatus described above is much simpler in design as compared with known apparatuses. No detail explanation is given as to the operation of wind tunnel force measuring apparatuses since this is well-known in the art. However, it should be noted that due to the extreme decoupling of the force components in the coordinate directions the evaluation of the measuring values determined by the force measuring elements is essentially simplified.

Though the use of the force division devices according to the invention has been explained in connection with wind tunnel force measuring apparatuses, it should be noted that the devices according to the invention may have many other applications in particular in cases where forces are to be divided with high accuracy and excellent decoupling.

When testing airplane models or the like the top side of the upper element 40 according to FIG. 3 may be provided with a stamp 81 at the upper end of which the object to be tested is secured.

Hydrostatic bearings may be replaced by aerostatic bearings without departing from the spirit of the invention.

I claim:

1. A device for dividing vector forces into a Z-component and at least one of a X- and Y-components comprising:
   a main body having a flat upper surface inclined to the horizontal;
   a wedge having a bottom surface inclined to the horizontal engaging essentially frictionfree the upper surface of the main body, and a flat horizontal upper surface;
   at least one first force measuring element acting in a direction of the wedge action and being provided in a fixed relationship to the main body;
   an upper element having a flat bottom side bearing essentially frictionfree in horizontal directions on the horizontal upper surface of the wedge and receiving a vector force to be measured; and
   at least one second force measuring element each acting in the at least one of the X- and Y-direction, limiting any movement of the upper element and being arranged in fixed relationship to the main body.

2. The device of claim 1 wherein the main body is placed on a base having secured thereto support means for the first and second force measuring elements.

3. The device of claim 1 wherein the main body, the wedge and the upper element are connected essentially frictionfree by a tilting preventing means.

4. The device of claim 3 wherein the tilting preventing means comprise hook-like arms provided at the main body and the upper element, which engage essentially frictionfree projections provided at the wedge.

5. The device of claim 1 wherein the X- and Y-directions one second force measuring element each is provided.

6. The device of claim 1 wherein in one of the X- and Y-directions one second force measuring element and in the other direction two second force measuring elements are provided.

7. The device of claim 1 wherein both in the X- and Y-directions two second force elements each are provided.

8. The device according to claim 1 wherein several second force measuring elements are provided for one or both of the X- and Y-directions these force measuring elements are arranged at the same side of the upper element.

9. The device according to claim 1 wherein several second force measuring elements for one or two of the X- and Y-directions at least part of the force measuring elements are arranged at opposite sides of the upper element.

10. The device of claim 1 wherein a biassing force is applied to the upper element and/or to the wedge for biassing the corresponding force measuring element.

11. A 7-components wind tunnel force measuring apparatus for determining force components exerted on an object to be tested comprising:
 a plurality of devices for dividing vector forces into coordinate components, the devices corresponding in number supporting points of the object to be tested and arranged there at, each device comprising:
 a base;
 a main body mounted on the base and having a flat upper surface inclined to the horizontal;
 a wedge having a bottom surface inclined to the horizontal engaging essentially frictionfree the upper surface of the main body, and a flat horizontal upper surface;
 at least one first force measuring element acting in a direction of the wedge action and being provided in a fixed relationship to the main body;
 an upper element having a flat bottom side bearing essentially frictionfree in horizontal directions on the horizontal upper surface of the wedge and receiving a vector force to be measured; and
 at least one second force measuring element each acting in the at least on the X- and Y-directions, limiting any movement of the upper element and being arranged in fixed relationship to the main body.

12. The force measuring apparatus of claim 11 wherein the base is a turn-table bearing four of the devices for dividing vector forces two-dimensionally shiftable on that turntable.

13. A 6-components wind tunnel force measuring apparatus for measuring components of a force exerted on an object placed in a flowing medium including a turn-table having a plurality of devices for dividing vector forces into their coordinate components placed thereon, in spaced relationship the devices comprising:
 a main body having a flat upper surface inclined to the horizontal;
 a wedge having a bottom surface inclined to the horizontal, engaging essentially frictionfree the upper surface of the main body, and a flat horizontal upper surface;
 at least one first force measuring element acting in a direction of wedge action and being provided in a fixed relationship to the main body;
 an upper element having a flat bottom side bearing essentially frictionfree in horizontal directions on the upper horizontal surface of the wedge;
the apparatus further comprising:
 a platform common to all of the devices and bearing on the upper elements of all devices in a frictionfree manner; and
 at least one second force measuring element, acting in the X- and/or Y-direction(s) and limiting any movement of the platform in that (those) direction(s).

14. The apparatus of claim 13 wherein the upper sides of the upper elements have a spheric recess each and the platform is provided with downward projections their lower ends of which are adapted to the spheric recesses and are bearing these recesses essentially frictionfree.

* * * * *